(12) United States Patent
Wei et al.

(10) Patent No.: US 7,965,726 B2
(45) Date of Patent: Jun. 21, 2011

(54) METHOD AND APPARATUS TO FACILITATE REAL-TIME PACKET SCHEDULING IN A WIRELESS COMMUNICATIONS SYSTEM

(75) Inventors: Bo Wei, Dallas, TX (US); Lin Ma, San Diego, CA (US); Zhigang Rong, San Diego, CA (US); Steven Craig Greer, Rowlett, TX (US)

(73) Assignee: Nokia Corporation, Espoo (FI)

( * ) Notice: Subject to any disclaimer, the term of this patent is extended or adjusted under 35 U.S.C. 154(b) by 858 days.

(21) Appl. No.: 11/401,246

(22) Filed: Apr. 11, 2006

(65) Prior Publication Data

US 2006/0227796 A1 Oct. 12, 2006

Related U.S. Application Data

(60) Provisional application No. 60/669,877, filed on Apr. 11, 2005.

(51) Int. Cl.
*H04L 12/28* (2006.01)

(52) U.S. Cl. ........ 370/412; 370/235; 370/335; 370/432; 370/411; 370/503; 370/428; 370/395.4; 370/338

(58) Field of Classification Search .................. 455/411, 455/410, 435.1, 414.1; 713/183, 171, 168, 713/155, 160, 185; 370/338, 311, 394.5, 370/235, 335, 432, 411, 503, 428, 395.43, 370/395.4, 412, 259, 249

See application file for complete search history.

(56) References Cited

U.S. PATENT DOCUMENTS

| | | | |
|---|---|---|---|
| 6,072,772 A * | 6/2000 | Charny et al. | 370/229 |
| 6,317,416 B1 * | 11/2001 | Giroux et al. | 370/232 |
| 7,103,350 B2 * | 9/2006 | Au et al. | 455/412.2 |
| 7,295,538 B2 * | 11/2007 | Aizawa et al. | 370/332 |
| 2002/0183066 A1 * | 12/2002 | Pankaj | 455/453 |
| 2003/0012220 A1 * | 1/2003 | Kim et al. | 370/455 |
| 2004/0013089 A1 * | 1/2004 | Taneja et al. | 370/235 |
| 2004/0097240 A1 * | 5/2004 | Chen et al. | 455/450 |
| 2004/0230675 A1 * | 11/2004 | Freimuth et al. | 709/223 |
| 2004/0258070 A1 * | 12/2004 | Arima | 370/395.4 |
| 2005/0175014 A1 * | 8/2005 | Patrick | 370/395.43 |
| 2005/0190796 A1 * | 9/2005 | Date et al. | 370/503 |
| 2007/0070894 A1 * | 3/2007 | Wang et al. | 370/230 |

FOREIGN PATENT DOCUMENTS

| | | |
|---|---|---|
| WO | WO 02/01761 | 1/2002 |
| WO | WO 03/071740 | 8/2003 |

OTHER PUBLICATIONS

Matthew Andrews, et al. (Lucent Technologies), Rajiv Vijayakumar (University of Michigan), "Providing Quality of Service over a Shared Wireless Link", Feb. 2001, pp. 150-154.

* cited by examiner

*Primary Examiner* — Kwasi Karikari
(74) *Attorney, Agent, or Firm* — Alston & Bird LLP

(57) ABSTRACT

A method, apparatus and system for scheduling data packets in a wireless communications system. The invention includes determining a priority for at least one data packet, wherein determining the priority of the data packet is based at least on a plurality of quality of service factors, wherein each of the plurality of QoS factors has a corresponding weighting factor and the determined priority includes minimum-performance guarantees. The invention further includes scheduling transmission of the at least one data packet based at least on the determined priority.

21 Claims, 5 Drawing Sheets

METHOD AND APPARATUS TO FACILITATE REAL-TIME PACKET SCHEDULING IN A WIRELESS COMMUNICATIONS SYSTEM

CROSS-REFERENCE TO RELATED APPLICATIONS

This application claims priority of U.S. Provisional Patent Application No. 60/669,877, filed on Apr. 11, 2005. The subject matter of this earlier filed application is hereby incorporated by reference.

BACKGROUND OF THE INVENTION

1. Field of the Invention

The present invention relates to methods and apparatus data packet scheduling over a wireless network.

2. Description of the Related Art

In many networking arrangements, it is necessary for a plurality of data streams to be combined to share a limited number of channels or even a single line. For example, in a wireless network may have a number of units that are routed to a base station which is further connected through a single channel. Thus, the various streams going to the individual units must be handled through a single channel. It is the same scenario where various kinds of data streams, such as voice data, real-time video data, email and other data are all handled through an Internet protocol network. These various kinds of data must be combined into a limited number of channels or even a single channel for transmission.

Whenever, these data streams are merged, it is necessary to have some protocol for selecting the order in which they are placed in the channel. While, the simplest approach may be a first come, first serve approach, this may not be the most effective since some data streams are more time sensitive than others. For example, voice signals cannot be delayed very much at all, while email messages may be delayed by a substantial amount. Accordingly, a number of protocols have been sought to provide fair and optimum criteria for multiple users so that delay is reduced, invalid data is minimized and data throughput is maximized.

In addition, there are new quality of service (QoS) mechanisms under development for application in fixed network routers. However, the function of radio network elements, e.g., the radio network controller and the user equipment is significantly different from those of a router. Typically, a router handles multiple input streams and provides multiple outputs streams extremely fast. The packets are delivered to the next network node depending on the destination address with the help of routing tables.

When packets arrive in a radio network controller, they are not routed based on the IP address anymore, but are routed using the radio network specific user equipment (UE) addresses. The packets can be delivered through different transmission channels called dedicated channels, common channels or shared channels. The essential difference as compared to a fixed network is that the traffic shares common radio resources. The radio resource is scarce and changes dynamically due to changes in the traffic load, but also due to the radio characteristics. The radio network subsystem (RNS) is characterized in that it can control the radio resource dynamically and share it in a fair or close to optimal manner. The RNS is also characterized in that it is planned and dimensioned to provide coverage and capacity over a certain service area and targeted to satisfy the subscribers' needs. The capacity and coverage depend on the location, mobility and traffic type of the UE, but also it depends on the location, mobility and traffic type of the other UEs in the same RNS.

The problem is simply that there is no support for satisfying different QoS requirements over the air interface. Actually there is traditionally not even QoS mechanisms for the fixed network. However, as suggested above, recent effort has resulted in a number of QoS mechanisms for the internet protocol (IP) traffic in the fixed network. Only the most simple and traditional means are known as giving different requirements for the bearers like the minimum guaranteed bit-rate requirement, maximum allowed service data unit (SDU) size and assigning each bearer a priority.

Current solutions for packet traffic, particularly packet scheduling do take into account the QoS requirements of real-time services when scheduling transmission of the packets, especially delay requirements. All data packets are treated with the same level of importance during data scheduling and the special properties of real-time data traffic such as for example, the perpetual importance of different speech frames in voice over internet protocol (VoIP), is not taken into account. This often results in poor voice quality and dropped calls.

One scheduling method is called Proportional fair (PF) scheduling. PF scheduling like most of wireless schedulers, assumes that the data buffers for all the links in the base station (BS) have data queued all the time waiting for transmission. This assumption is not always valid, however, for real-time traffic such as VoIP. In other words, "fairness" will fail to be performed for the users with bounded timeline and various arriving and queuing situation.

Further, the PF scheduler neglects the fact that some other factors related to the source properties could also be incorporated in the scheduler for further system enhancement, not only higher capacity but also better link level quality, especially in the case of real-time applications instead of data.

Another packet scheduler is called the Weighted Metric (WM) Scheduler with frame error rate (FER) information. With the WM scheduler, the priority of a link is a weighted sum of the head-of-the-line packet waiting time in the base station buffer, the channel quality (in dB scale) and the frame error rate. The FER scheduler actually incorporates QoS factors such as delay and FER and capacity enhancement for delay-sensitive real-time traffic is utilized. However, the WM scheduler is sub-optimum because it does not provide minimum-performance guarantees to the real-time users. For example in this method, the delay guarantees of the packet depends on the length of another packet in a different path, that shares the same channel.

In another example scheduler, an opportunistic scheduler for streaming video was proposed recently for wireless networks. In the opportunistic scheduler, the amount of available buffer space and some level of frame importance index are incorporated in PF as additional factors. However, the available buffer space factor only compensates for the instability of PF due to finite queues while delay as the most important factor for real-time stream, is not addressed in this opportunistic scheduler. In addition, the problem on how to set packet importance to physical layer encoder packet (EP) constructed by multiple smaller packets, which is a serious problem for VoIP applications where packet length is relative small, is highly neglected.

Packet scheduling mechanisms such as the proportional fair scheduler, allocate resources in an inefficient manner which result in low system capacity. Thus, there is a need for a packet scheduler that takes into account the factors that affect QoS, and frame importance of real-time services.

Accordingly the present invention includes a method, apparatus and system for scheduling data packets in a wireless communications system. In one exemplary embodiment of the invention a method for scheduling data packets in a wireless communications system is described. The method includes determining a priority for at least one data packet, wherein determining the priority of the data packet is based at least on a plurality of quality of service factors, wherein each of the plurality of QoS factors has a corresponding weighting factor. The method further includes scheduling transmission of the at least one data packet based at least on the determined priority.

According to another exemplary embodiment of the invention an apparatus for scheduling data packets in a wireless communications system is described. The apparatus includes a priority means for determining a priority for at least one data packet, wherein the priority module determines the priority of the data packet based at least on a plurality of quality of service (QoS) factors, wherein each of the plurality of QoS factors has a corresponding weighting factor. The apparatus further includes a scheduling means for scheduling transmission of the at least one data packet based at least on the determined priority.

According to another exemplary embodiment of the invention a system for scheduling data packets in a wireless communications system is described. The system includes a priority module that determines a priority for at least one data packet, by determining a plurality of quality of service (QoS) factors, wherein each of the plurality of QoS factors has a corresponding weighting factor. The system further includes a scheduling module that schedules transmission of the at least one data packet based at least on the determined priority.

DETAILED DESCRIPTION OF THE PREFERRED EMBODIMENT(S)

According to an exemplary embodiment of the invention, a general packet scheduler for real-time services takes into account the head-of-the-line packet queuing delay in the base station buffer, packet importance indication and the channel quality, when deciding the priority of packet transmission. According to the packet scheduler according to the present invention, the system resources are allocated more efficiently and a higher system capacity is achieved at the system level. In addition, individual user performance is improved.

Figure 1:
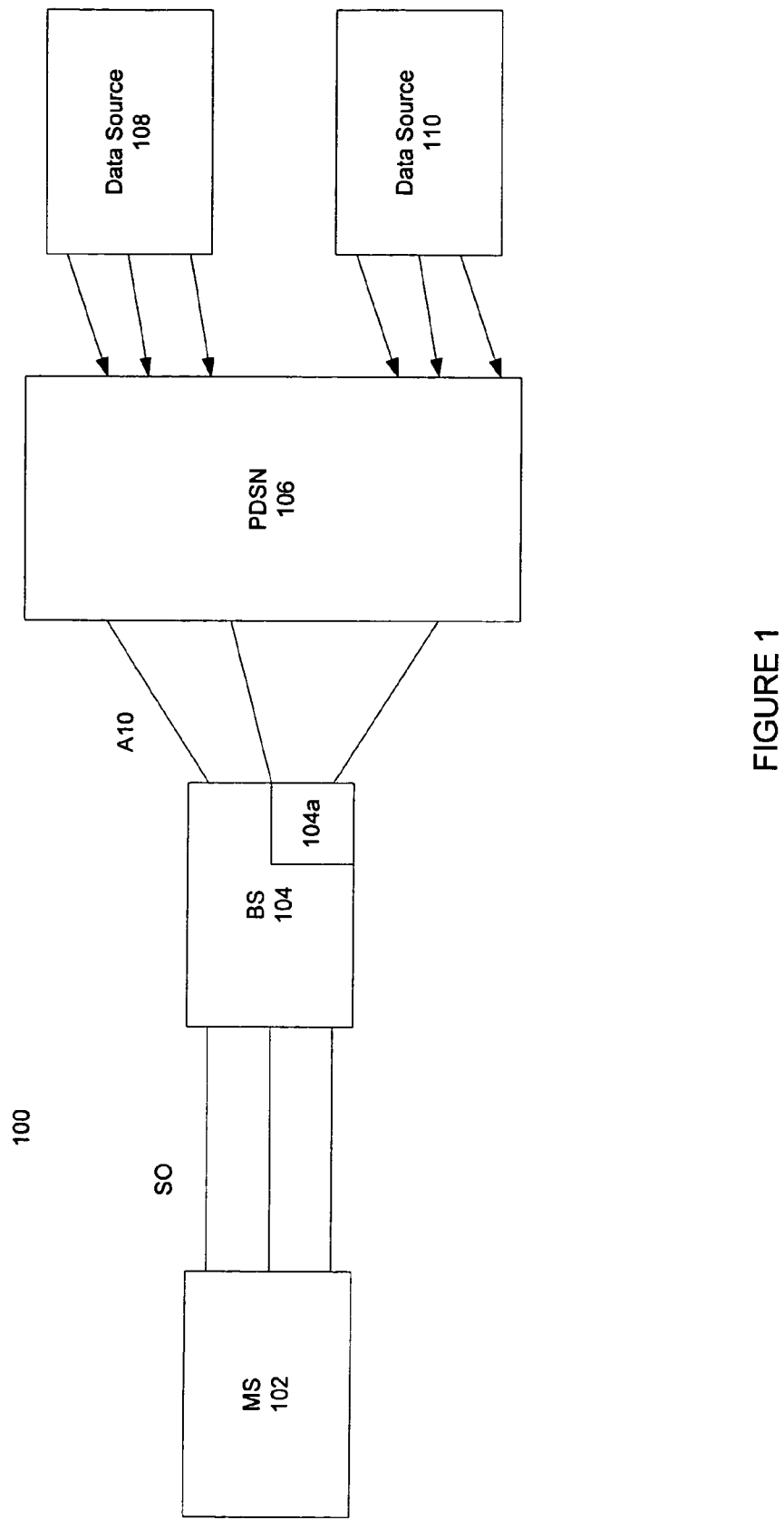
FIG. 1 illustrates an exemplary communication system adapted for data communications.

FIG. 1 is an exemplary communication system adapted for data communications. The communication system 100 includes a Mobile Station (MS) 102 in communication with a Base Station (BS) 104. The BS 104 is further in communication with a Packet Data Service Node (PDSN) 106, as well as with other components for processing voice communications, etc. (not shown). Still further, BS 104 contains a buffer 104a. The PDSN 106 serves as an interface for the MS 102 and the BS 104 with data networks, such as networks supporting IP communications.

The MS 102 supports data communications, wherein several A10 connections and Service Option (SO) connections are illustrated. A SO connection is used for communication of a selected Service Option, such as packet data services. An A10 connection then provides a link for sending Internet Protocol (IP) packets between the PDSN 106 and BS 104. The SO connection provides a link for sending IP packets between the MS 102 and BS 104. There is a one-to-one mapping between the SO connection (MS-BS) and A10 connection (BS-PDSN). Multiple A10 connection pairs are illustrated in FIG. 1, as the MS 102 supports multiple simultaneous connections. In other words, the MS 102 is able to process multiple packet flows in parallel. Each packet flow is assigned to an A10 connection or link. The assignment of a packet flow to an A10 link is referred to as packet flow "mapping" and is determined by the PDSN. There are a variety of criteria and algorithms for such mapping that are applicable in the system 100 of FIG. 1.

As discussed hereinabove, each SO connection or link between the MS 102 and BS 104 has a corresponding A10 connection or link between the BS 104 and the PDSN 106. The correspondence is illustrated by the lines through BS 104. SO/A10 connections may be used for a bi-directional or interactive communication, such as a Voice over IP (VOIP) communication, or may be used for a unidirectional communication, such as to download data or for the streaming of information from an Internet source. As the number of type of data communications increases, SO/A10 connections may be implemented for more and more of these communications. Note that multiple SO connections (a.k.a. service instances) are needed to support different QoS requirements of packet flows. For example, the MS 102 may have two active SO connections. The first SO connection having retransmission mechanisms to provide reliable transport over the air at the cost of transmission latency, and, therefore, is used for transporting data that requires reliable transmission. The second SO connection may not have retransmission mechanisms and is used for transporting data that requires expedited transmission.

The PDSN 106 receives packet flows from a data source 108 and 110. The data source 108 may be a node on the Internet, a service provider, a terminal, etc. In other words, the data source 108 is a source of information or a participant to a communication. Note that the PDSN 106 may receive multiple packet flows from multiple sources, wherein said packet flows are destined for multiple participants, such as MS 102. Each packet flow is mapped to a corresponding SO/A10 connection and is processed according to the parameters negotiated by the participants.

The flow mapping and treatment of each packet flow is particularly important when multiple service instances are set up to a given user, such as MS 102. If the MS 102 has multiple active service instances and the MS 102 uses multiple header compression algorithms, the PDSN 106 will desire information for processing the packet flows associated with each service instance. Information includes, but is not limited to, the specific header compression algorithms used for each packet flow, and the mapping of each packet flow to each A10 connection.

Figure 2:
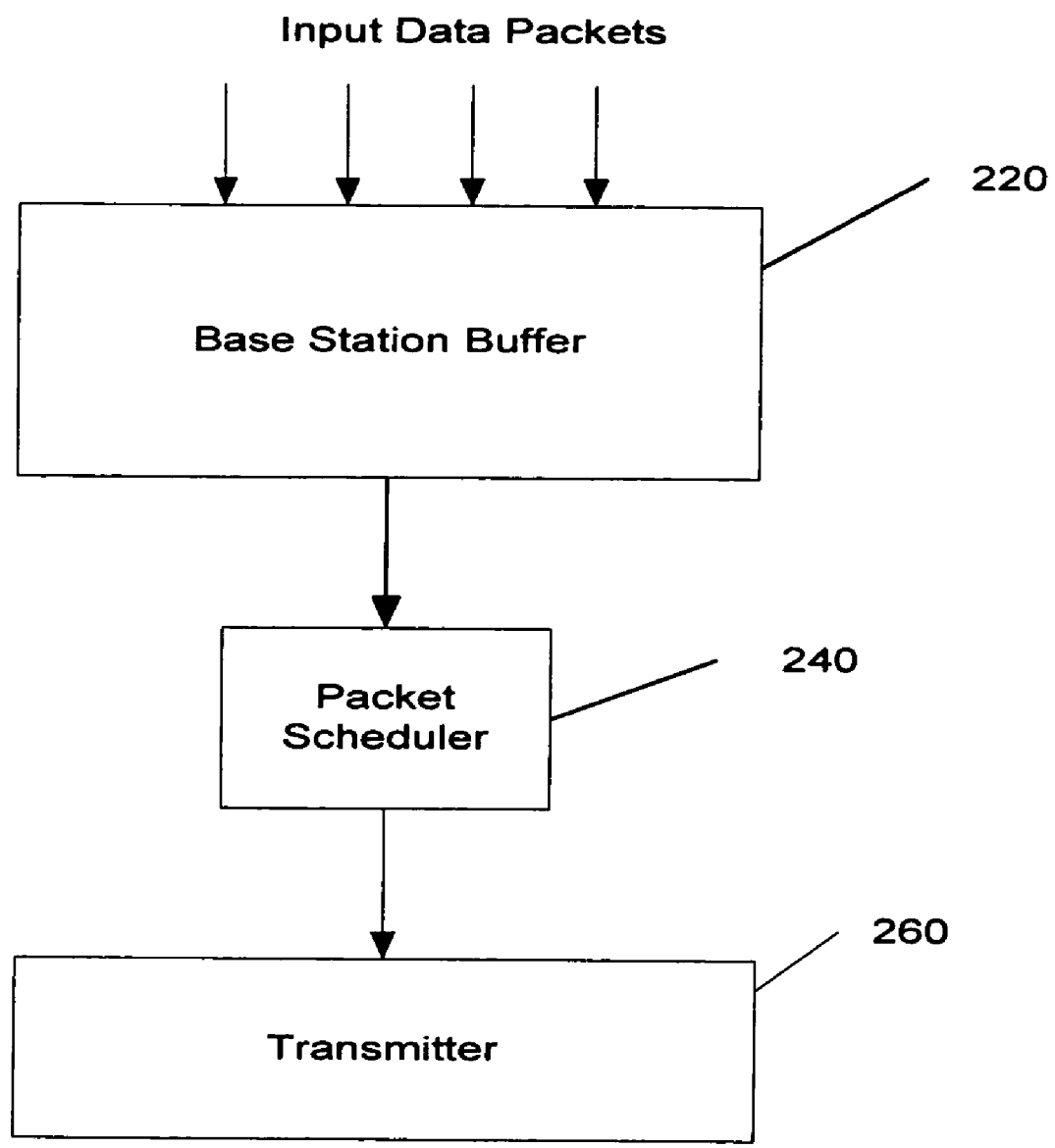
FIG. 2 is a flow diagram according to an exemplary embodiment of the present invention.

FIG. 2 is an exemplary block diagram for implementing the method of the present invention. Once the data packets are received by the BS buffer 220 and stored. The packet scheduler 240 determines the priority of the data packets at time a given time (t) for a user (i). The packet scheduler 240 selects the data packets that are to be transmitted next by the transmitter 260.

An exemplary embodiment of the present invention is discussed below. Note that this example is given for illustration purposes. Other exemplary embodiments of this invention with modifications of and alterations to the following descriptions are possible, and should remain within the scope of this invention. The invention provides a general form for scheduling packets for real-time services according to the present invention. The algorithm in accordance with an exemplary embodiment of the invention, should be in the form of the product for the available data rate, the packet delay and the frame priority index, with weighting factors for each of the QoS factors to achieve the best performance. The result is an optimum scheduler with minimum performance guarantees for real-time services.

In accordance with an exemplary embodiment of the invention, the packet scheduler takes into account the packet queuing delay, the channel quality, average user throughput as well as the frame importance when generating the priority. The general form of this scheduler can be expressed as:

$$Priority_i(t) = C_i \frac{U_i(t)^\alpha}{F_i(t)^\varphi} \frac{D_i(t)^\beta}{I_i(t)^\gamma} \quad (1)$$

where $Priority_i(t)$ is the priority of the packet at time t for user i, $U_i(t)$ is the data rate control (DRC) reported by mobile station (MS) at current time slot. $D_i(t)$ is the packet queuing delay in the BS buffer, measured in number of slots (i.e., 1.67 ms) in DO and counted from the time the packet arrives at the BS, $F_i(t)$ is the fairness throughput which is the moving average of DRC $U_i$ and $I_i(t)$ is the frame importance indication. $\alpha, \beta, \gamma$ and $\varphi$ are the weighting factors for DRC, the packet queuing delay, the frame importance indication and fairness throughput, respectively. In addition, $C_i$ is the traffic priority factor that could provide different QoS for different data traffic types, including but not limited to, HTTP, FTP, VoIP, Video Streaming etc., co-existing in the same system.

Thus, minimum-performance guarantee constraint matches the requirements for real-time packet scheduling because unlike the data only case, real-time user desired throughput is near constant most of the time, e.g., average bit rate around 3.2 kbps for strawman speech codec in VoIP. The scheduler according to the present invention fulfills the form for "optimum" scheduler with minimum-performance guarantee constrains which is $Priority_i(t)=W_i(t)U_i(t)$. Which translates into:

$$W_i(t) = \frac{C_i D_i(t)^\beta}{F_i(t)^\varphi, I_i(t)^\gamma}.$$

In delay sensitive services such as VoIP, it is common that a packet drop timer is used to decide if a data packet is to be discarded after waiting in the buffer for too long. Therefore, the packet queuing delay $D_i(t)$ will not keep increasing and an upper limit typically is applied.

A physical layer encoder packet (EP) may contain a single, multiple frames for one user or even multiple user packets. In this case, scheduler has to take into account these facts when the value of $I_i(t)$ can be decided. In another exemplary embodiment of the invention a setup of $I_i(t)$ in the later example for VoIP over EV-DO system is used.

The weighting factors of the packet scheduler, e.g., $\alpha, \beta, \gamma$ and $\varphi$ could be selected by the base station based on a predefined set of values, or based on the values previously used for a user.

In Eq. (1), $$\frac{U_i(t)}{F_i(t)^\varphi}$$

part is actually the original PF scheduler, on top of that, $D_i(t)$ provides users who have been waiting too long, higher priority and $I_i(t)$ gives higher priority to more important encoder packet. By adjusting the delay and packet important factors, the proposed packet scheduler allows the system to allocate the resource more flexibly and efficiently for real-time users.

Figure 3:
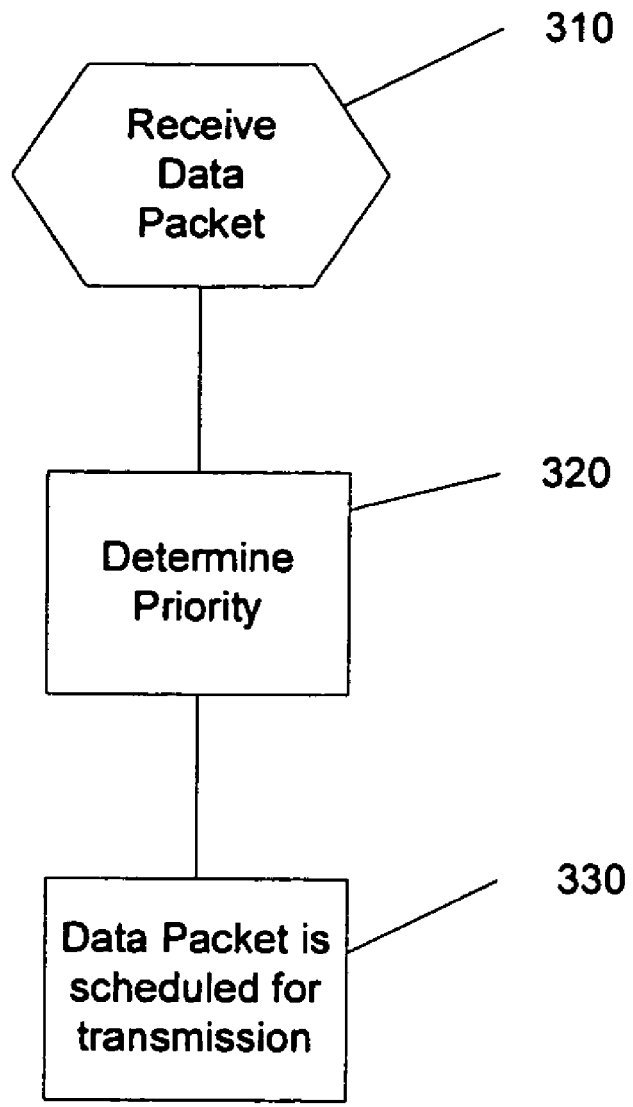
FIG. 3 illustrates a process for determining the transmission priority of a packet according to an exemplary embodiment of the present invention.

The process for determining the transmission priority of the packet in accordance with the present invention is illustrated in FIG. 3. At 310 when data packet arrives at the BS buffer, the packet scheduler decides the transmission priority of the packet 320. As discussed above the QoS factors are considered in determining the priority. As discussed above the QoS factors include, but are limited to, data rate control (DRC), packet queuing delay, channel quality, average user throughput and frame importance and each of the QoS factors includes a weighting factor. At 330 the data packet is scheduled according to the determined priority. In the exemplary embodiment of the invention, the QoS factors are utilized to form an algorithm shown in equation (1) above.

To evaluate the gain from the packet scheduler of the present invention, system level simulations of VoIP over Forward Traffic Channel in EV-DO Rev. A system, were performed and the performance of the following schedulers were compared.

Proportional-Fairness scheduler. The priority of a packet is the ratio of user requested data rate and the average data rate current user experienced so far. It can be expressed as $$Priority_i(t) = \frac{U_i(t)^\alpha}{F_i(t)^\varphi} \quad (2)$$

where $U_i(t)$ is the DRC reported by MS at time t, $F_i(t)$ is the fairness throughput which is the moving average of DRC $U_i$.

Weighted Metric (WM) scheduler with FER. The priority of a packet is a weighted sum of the packet queuing delay in the base station buffer, the channel quality (in dB scale) and the frame error rate. The priority of a packet can be expressed as $$Priority(t)=\alpha \cdot U(t)+\beta \cdot T_b(t)+\gamma \cdot \log_{10} FER(t) \quad (3)$$

where $U(t)$ is the requested data rate in kbps at time t, $T_b(t)$ is the packet queuing delay in the BS buffer, measured in number of slots (i.e., 1.67 ms) and counted from the time the packet arrives at the BS, $FER(t)$ is the estimated FER of the service at time t based on the ACK/NACK bits received from the MS. $\alpha, \beta,$ and $\gamma$ are the weighting factors.

Real-time packet scheduler. This is the scheduler of the present invention as that in the example of Eq. (1). In Eq. (4) and the following simulation, the traffic priority $C_i$ is set as 1 for simplicity to illustrate the exemplary example, i.e., all users in the system are VoIP users. This setup will be useful to show VoIP capacity enhancement.

$$Priority_i(t) = \frac{U_i(t)^\alpha}{F_i(t)^\varphi} \frac{D_i(t)^\beta}{I_i(t)^\gamma} \quad (4)$$

Note that in this VoIP over EV-DO simulation, source-controlled variable-rate strawman speech codec is applied. Speech frames are classified to Full Rate (FR), Half Rate (HR), Quarter Rate (QR) and Eighth Rate (ER) according to the speech activity and relative importance to the perceptual quality. In this case, the EP frame importance indication $I_i(t)$ is set as follows:

$$I_i(t) = \begin{cases} 1.0 & \text{when there are } FR \text{ or } HR \text{ frames in } EP \text{ if scheduled} \\ 0.25 & \text{otherwise} \end{cases} \quad (5)$$

When comparing performance of different packet schedulers, a comprehensive search of the weighting factors that yield the best performance is performed for each individual packet scheduler under the mixed channel environment, then the performance of each packet scheduler based on the optimal weighting factors is compared. Table 1 lists the weighting factors used for each of the packet schedulers. Note that these weighting factors may have different meaning for different schedulers, please refer to Eq. (2)-(4) for details.

TABLE 1

Weighting Factors of Packet Schedulers

| | α | β | γ | φ |
|---|---|---|---|---|
| Proportional-Fairness | 1.0 | N/A | N/A | 1.5 |
| WM with FER | 0.01 | 1.0 | 5.0 | N/A |
| Real-time packet scheduler | 1.0 | 2.0 | 1.0 | 1.5 |

Figure 4:
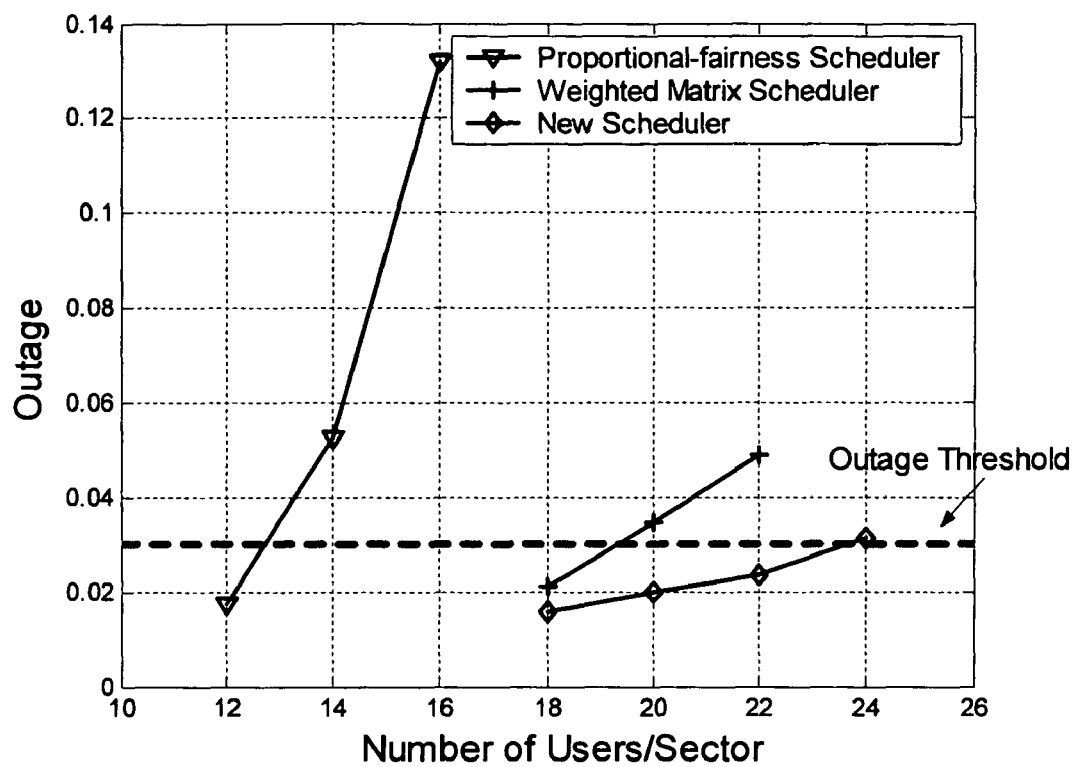
FIG. 4 illustrates the performance of different packet schedulers.

FIG. 4 illustrates the performance of different packet schedulers. In FIG. 4, all the curves are based on dual receiver antenna and the same drop timer. FIG. 4 illustrates that the packet scheduler of the present invention outperforms other schedulers by providing a gain of about 11 user/sector over the PF scheduler and about 4 user/sector over WM scheduler with FER.

Figure 5:
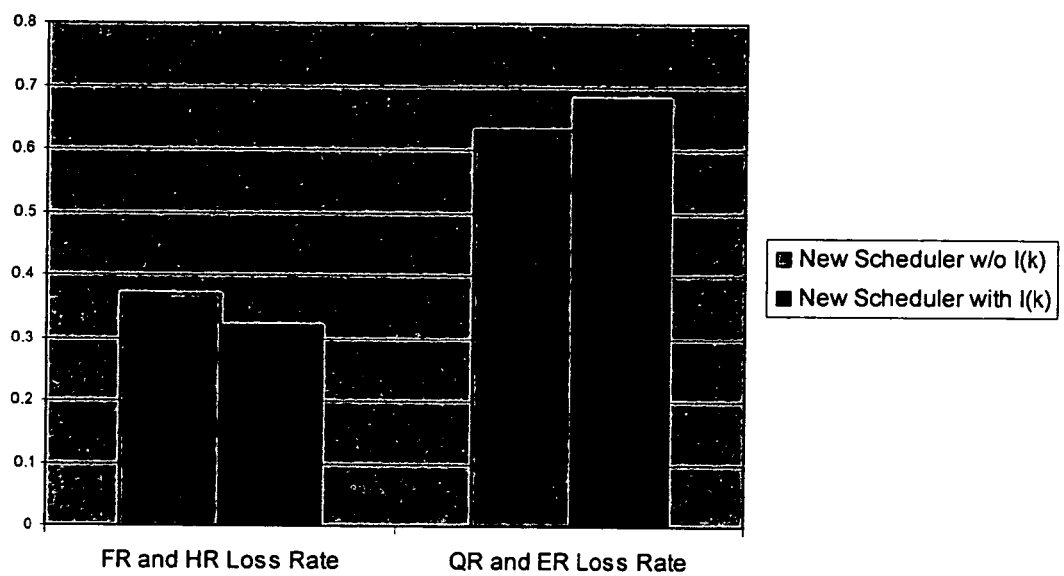
FIG. 5 illustrates the importance of keeping the frame importance indication in the scheduler.

FIG. 5 illustrates the importance of keeping the frame importance indication $I_i(t)$ in the scheduler. The frame importance indication has the minor impact to the overall system capacity. However, from FIG. 5, about 15% FR and HR speech frame loss has been transferred to QR and ER, which have less perceptual impact to the speech quality. With this kind of frame loss transfer, better overall speech quality is achieved.

The advantage of the packet scheduler is that by utilizing the queuing delay information and source frame importance information when deciding the transmission priority of the real-time data packet, the base station can allocate system resource to users with various channel conditions more efficiently, which eventually could result in a better performance in system level and better individual user voice quality.

One having ordinary skill in the art will readily understand that the invention as discussed above may be practiced with steps in a different order, and/or with hardware elements in configurations which are different than those which are disclosed. For example, the present invention may be implemented at least as a computer product including computer-readable code, a chip set or ASIC, or a processor configured to implement the method or system. Therefore, although the invention has been described based upon these preferred embodiments, it would be apparent to those of skill in the art that certain modifications, variations, and alternative constructions would be apparent, while remaining within the spirit and scope of the invention.

The invention includes a method for real-time packet scheduling including determining a priority of a data packet. The priority of the data packet is determined based on quality of service factors including a traffic priority factor, data rate control, packet queuing delay, fairness throughput and frame importance indication.

The invention further includes a method that provides a minimum performance guarantee for providing packets for real-time service.

The invention claimed is:

1. A method, comprising:
   determining, by a processor, a priority for at least one data packet, wherein determining the priority of the at least one data packet is based at least on a plurality of quality of service factors, wherein each of the plurality of quality of service factors has a corresponding weighting factor, and the determined priority includes minimum-performance guarantees;
   determining a product by multiplying the priority by a traffic priority factor associated with different data traffic types; and
   scheduling transmission of the at least one data packet based at least on the determined product.

2. The method of claim 1, wherein the plurality of quality of service factors includes data rate control, packet queuing delay, channel quality, average user throughput and frame importance.

3. The method of claim 2, wherein the priority of the at least one data packet at a given time (t) for user (i) is determined by $$Priority_i(t) = \frac{U_i(t)^\alpha}{F_i(t)^\varphi} \frac{D_i(t)^\beta}{I_i(t)^\gamma},$$

wherein Ui (t) is a data rate control reported by a mobile station, Di (t) is a packet queuing delay in a base station buffer, Fi (t) is a fairness throughput and Ii (t) is a frame importance indication; and wherein α, is a weighting factor for the data rate control, β, is a weighting factor for the packet queuing delay, γ is a weighting factor for the frame importance indication and, φ is a weighting factor for the fairness throughput.

4. The method of claim 3, wherein the traffic priority factor comprises a traffic priority factor Ci, which is multiplied by the Priority i (t).

5. An apparatus comprising at least one processor and at least one memory storing computer program code, wherein the at least one memory and stored computer program code are configured to, with the at least one processor, cause the apparatus to at least:
   determine a priority for at least one data packet, by determining a plurality of quality of service factors, wherein each of the plurality of quality of service factors has a corresponding weighting factor and the determined priority includes minimum-performance guarantees;
   determine a product by multiplying the priority by a traffic priority factor associated with different data traffic types; and
   schedule transmission of the at least one data packet based at least on the determined product.

6. The apparatus of claim 5, wherein the plurality of quality of service factors includes data rate control, packet queuing delay, channel quality, average user throughput and frame importance.

7. The apparatus of claim 6, wherein the at least one memory and stored computer program code are configured to, with the at least one processor, cause the apparatus to determine the priority of the at least one data packet at a given time (t) for user (i) by $$Priority_i(t) = \frac{U_i(t)^\alpha}{F_i(t)^\varphi} \frac{D_i(t)^\beta}{I_i(t)^\gamma},$$

wherein Ui (t) is a data rate control reported by a mobile station, Di (t) is a packet queuing delay in a base station buffer, Fi (t) is a fairness throughput and Ii (t) is a frame importance indication; and wherein α, is a weighting factor for the, β, is a weighting factor for the packet queuing delay, γ is a weighting factor for the frame importance indication and , φ is a weighting factor for the fairness throughput.

8. The apparatus of claim 7, wherein the at least one memory and stored computer program code are configured to, with the at least one processor, cause the apparatus to determine the product by multiplying a traffic priority factor Ci by the Priority i (t).

9. The apparatus of claim 5, wherein the at least one memory and stored computer program code are configured as firmware.

10. An apparatus comprising:
a packet scheduler configured to determine which of a plurality of data packets are to be transmitted, wherein the packet scheduler is further configured to determine a priority of each of the plurality of data packets based at least on a plurality of quality of service factors, wherein each of the plurality of quality of service factors has a corresponding weighting factor, and the determined priority includes minimum-performance guarantees, and wherein the determined priority is multiplied by a traffic priority factor associated with different data traffic types.

11. The apparatus of claim 10, wherein in the packet scheduler, the plurality of quality of service factors used to determine the priority of the data packets includes data rate control, packet queuing delay, channel quality, average user throughput and frame importance.

12. The apparatus of claim 11, wherein in the packet scheduler the priority of the at least one data packet at a given time (t) for user (i) is determined by $$Priority_i(t) = \frac{U_i(t)^\alpha}{F_i(t)^\varphi} \frac{D_i(t)^\beta}{I_i(t)^\gamma},$$

wherein Ui (t) is a data rate control reported by a mobile station, Di (t) is a packet queuing delay in a base station buffer, Fi (t) is a fairness throughput and Ii (t) is a frame importance indication; and wherein α, is a weighting factor for the data rate control, β, is a weighting factor for the packet queuing delay, γ is a weighting factor for the frame importance indication and , φ is a weighting factor for the fairness throughput.

13. The apparatus of claim 12, wherein the traffic priority factor comprises a traffic priority factor Ci, and wherein in the packet scheduler the traffic priority factor Ci is multiplied by the Priority i (t).

14. A computer program product comprising at least one non-transitory computer-readable medium storing a computer program, wherein the computer program is configured to control a computer to perform a method, the method comprising:

determining a priority for at least one data packet, wherein determining the priority of the at least one data packet is based at least on a plurality of quality of service factors, wherein each of the plurality of quality of service factors has a corresponding weighting factor, and the determined priority includes minimum-performance guarantees;

determining a product by multiplying the priority by a traffic priority factor associated with different data traffic types; and scheduling transmission of the at least one data packet based at least on the determined product.

15. The computer program product of claim 14, wherein the plurality of quality of service factors includes data rate control, packet queuing delay, channel quality, average user throughput and frame importance.

16. The computer program product of claim 15, wherein the priority of the at least one data packet at a given time (t) for user (i) is determined by $$Priority_i(t) = \frac{U_i(t)^\alpha}{F_i(t)^\varphi} \frac{D_i(t)^\beta}{I_i(t)^\gamma},$$

wherein Ui (t) is a data rate control reported by a mobile station, Di (t) is a packet queuing delay in a base station buffer, Fi (t) is a fairness throughput and Ii (t) is a frame importance indication; and wherein α, is a weighting factor for the data rate control, β, is a weighting factor for the packet queuing delay, γ is a weighting factor for the frame importance indication and, φ is a weighting factor for the fairness throughput.

17. The computer program product of claim 16, wherein the traffic priority factor comprises a traffic priority factor Ci, which is multiplied by the Priority i (t).

18. A system, comprising:
means for determining a priority for at least one data packet, wherein the priority means determines the priority of the data packet based at least on a plurality of quality of service factors, wherein each of the plurality of quality of service factors has a corresponding weighting factor and the determined priority includes minimum-performance guarantees;

means for determining a product by multiplying the priority by a traffic priority factor associated with different data traffic types; and means for scheduling transmission of the at least one data packet based at least on the determined product.

19. The system of claim 18, wherein in the priority means, the plurality of quality of service factors used to determine the priority of the data packets includes data rate control, packet queuing delay, channel quality, average user throughput and frame importance.

20. The system of claim 19, wherein in the priority means the priority of the at least one data packet at a given time (t) for user (i) is determined by $$Priority_i(t) = \frac{U_i(t)^\alpha}{F_i(t)^\varphi} \frac{D_i(t)^\beta}{I_i(t)^\gamma},$$

wherein Ui (t) is a data rate control reported by a mobile station, Di (t) is a packet queuing delay in a base station buffer, Fi (t) is a fairness throughput and Ii (t) is a frame importance indication; and wherein α, is a weighting factor for the data rate control, β, is a weighting factor for the packet queuing delay, β is a weighting factor for the frame importance indication and, φ is a weighting factor for the fairness throughput.

21. The system of claim 20, wherein the traffic priority factor comprises a traffic priority factor Ci, which is multiplied by the Priority i (t).

* * * * *